(12) United States Patent
Hu et al.

(10) Patent No.: US 11,625,298 B2
(45) Date of Patent: *Apr. 11, 2023

(54) MEMORY BLOCK DEFECT DETECTION AND MANAGEMENT

(71) Applicant: Micron Technology, Inc., Boise, ID (US)

(72) Inventors: Guang Hu, Mountain View, CA (US); Ting Luo, Santa Clara, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/746,754

(22) Filed: May 17, 2022

(65) Prior Publication Data

US 2022/0276928 A1 Sep. 1, 2022

Related U.S. Application Data

(63) Continuation of application No. 17/087,334, filed on Nov. 2, 2020, now Pat. No. 11,340,982.

(51) Int. Cl.
*G06F 11/10* (2006.01)
*G06F 9/455* (2018.01)
(Continued)

(52) U.S. Cl.
CPC ...... *G06F 11/1068* (2013.01); *G06F 9/45504* (2013.01); *G06F 11/14* (2013.01);
(Continued)

(58) Field of Classification Search
CPC .. G06F 11/1068; G06F 9/45504; G06F 11/26; G06F 11/14; G06F 11/16; G06F 13/1636
(Continued)

(56) References Cited

U.S. PATENT DOCUMENTS

| 8,976,609 | B1* | 3/2015 | Frayer | G11C 29/04 |
| | | | | 365/201 |
| 9,679,661 | B1* | 6/2017 | Guo | G11C 16/08 |

(Continued)

FOREIGN PATENT DOCUMENTS

| KR | 1020190128794 | 11/2019 |
| WO | 2017074570 | 5/2017 |

OTHER PUBLICATIONS

International Search Report and Written Opinion from related PCT Application No. PCT/US2021/055777, dated Feb. 15, 2022, 11 pages.

(Continued)

*Primary Examiner* — John J Tabone, Jr.
(74) *Attorney, Agent, or Firm* — Brooks, Cameron & Huebsch, PLLC

(57) ABSTRACT

An apparatus includes a memory sub-system comprising a plurality of memory blocks and a memory block defect detection component. The memory block defect detection component is to set, for a memory block among the plurality of memory blocks, a first block defect detection rate and determine whether the first block defect detection rate is greater than a threshold block defect detection rate for the at least one memory block. In response to a determination that the first block defect detection rate is greater than the threshold block defect detection rate for the memory block, the memory block defect detection component is to assert a program command on the memory block determine whether a program operation associated with assertion of the program command on the at least one memory block is successful. In response to a determination the program operation is unsuccessful, the memory block defect detection component is to determine that a failure involving a plane (Continued)

associated with the memory block and another plane of the memory sub-system has occurred.

20 Claims, 5 Drawing Sheets

(51) Int. Cl.
    *G06F 11/26*     (2006.01)
    *G06F 11/14*     (2006.01)
    *G06F 13/16*     (2006.01)
    *G06F 11/16*     (2006.01)

(52) U.S. Cl.
    CPC .............. *G06F 11/16* (2013.01); *G06F 11/26* (2013.01); *G06F 13/1636* (2013.01)

(58) Field of Classification Search
    USPC ...... 714/819, 6.13, 723, 704, 718, 719, 773;
    365/200, 201, 185; 396/47.31, 53.35,
    396/30.21, 30.22
    See application file for complete search history.

(56) References Cited

U.S. PATENT DOCUMENTS

| | | | |
|---|---|---|---|
| 10,353,598 B2 * | 7/2019 | Huang | G06F 3/0619 |
| 10,553,290 B1 * | 2/2020 | Muchherla | G11C 16/349 |
| 10,923,192 B2 | 2/2021 | Kim | |
| 11,061,757 B2 * | 7/2021 | Lee | G11C 16/3459 |
| 2011/0267908 A1 * | 11/2011 | Kim | G11C 29/785 |
| | | | 365/200 |
| 2014/0231954 A1 | 8/2014 | Lue | |
| 2014/0237165 A1 | 8/2014 | Seo et al. | |
| 2015/0325298 A1 * | 11/2015 | D'Abreu | G11C 29/42 |
| | | | 365/185.09 |
| 2015/0347228 A1 * | 12/2015 | Yang | G06F 11/1068 |
| | | | 714/704 |
| 2015/0364218 A1 * | 12/2015 | Frayer | G06F 12/0246 |
| | | | 714/6.13 |
| 2016/0098216 A1 | 4/2016 | Huang et al. | |
| 2016/0163393 A1 * | 6/2016 | Liang | G11C 16/26 |
| | | | 365/185.12 |
| 2016/0179386 A1 | 6/2016 | Zhang | |
| 2016/0218740 A1 * | 7/2016 | Parthasarathy | G06F 11/07 |
| 2017/0177425 A1 * | 6/2017 | Jei | G06F 11/1072 |
| 2017/0249207 A1 * | 8/2017 | Sharon | G06F 11/1004 |
| 2018/0089024 A1 * | 3/2018 | Hahn | G06F 11/1048 |
| 2018/0286492 A1 | 10/2018 | Lee et al. | |
| 2020/0005873 A1 * | 1/2020 | Yazovitsky | G11C 16/349 |
| 2020/0066355 A1 * | 2/2020 | Papandreou | G11C 16/0483 |
| 2020/0273529 A1 | 8/2020 | Liu | |
| 2020/0411130 A1 * | 12/2020 | Frolikov | G06F 11/076 |
| 2021/0125674 A1 * | 4/2021 | Chen | G11C 16/0483 |
| 2021/0264980 A1 * | 8/2021 | Sagron | G11C 16/3459 |
| 2021/0343351 A1 * | 11/2021 | Chiang | G11C 29/025 |
| 2021/0375387 A1 * | 12/2021 | Nevill | G11C 8/08 |
| 2021/0383886 A1 * | 12/2021 | Alrod | G11C 29/44 |

OTHER PUBLICATIONS

Choudhuri, et al., "Performance Improvement of Block Based NAND Flash Translation Layer", retrieved from https://www.ics.uci.edu/~givargis/pubs/C32.pdf., Sep. 30-Oct. 3, 2007, 6 pages.

* cited by examiner

MEMORY BLOCK DEFECT DETECTION AND MANAGEMENT

PRIORITY INFORMATION

This application is a Continuation of U.S. application Ser. No. 17/087,334, filed Nov. 2, 2020, the contents of which are included herein by reference.

TECHNICAL FIELD

Embodiments of the disclosure relate generally to memory sub-systems, and more specifically, relate to memory block defect detection and management.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
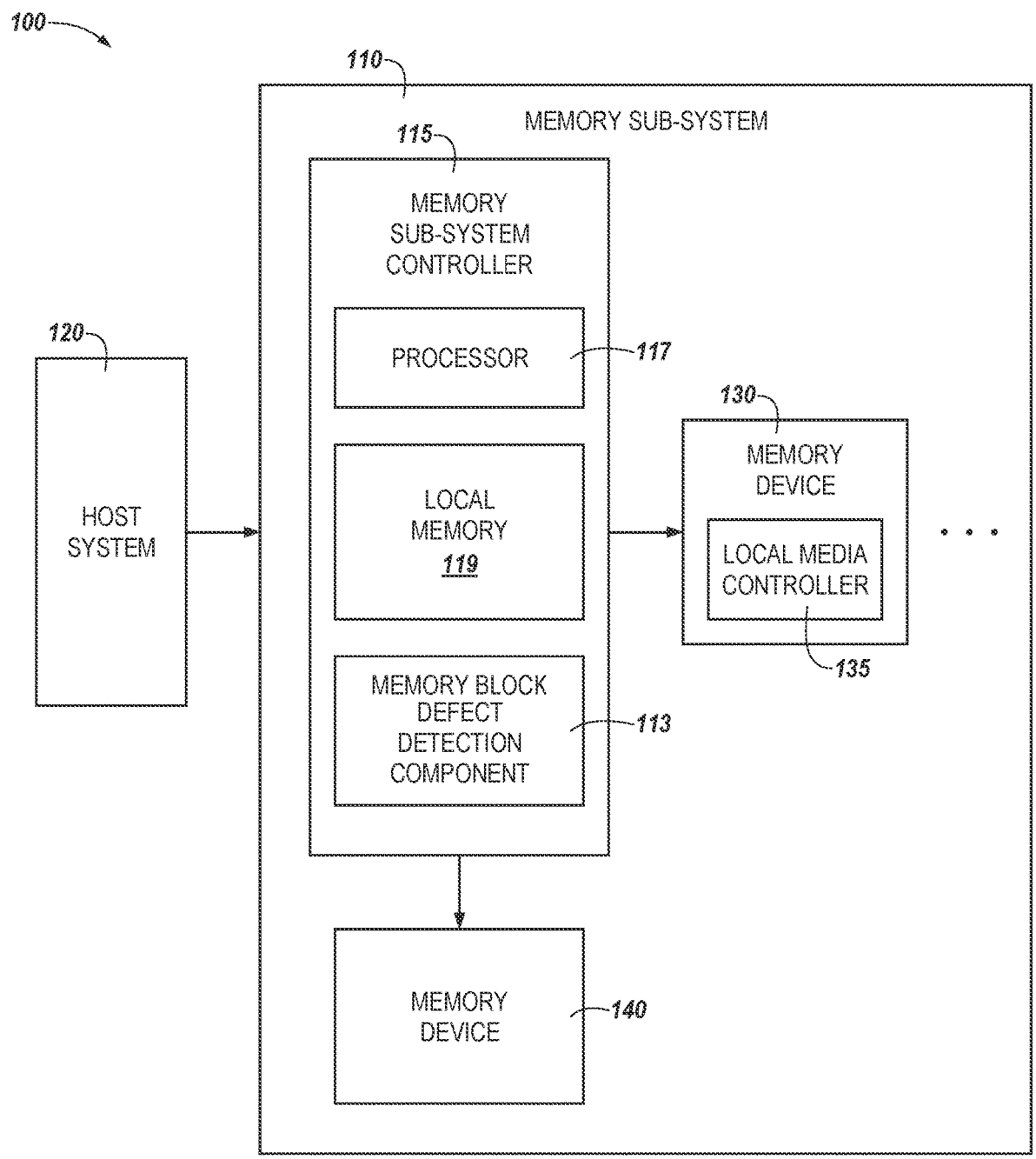
FIG. 1 illustrates an example computing system that includes a memory sub-system in accordance with some embodiments of the present disclosure.

Aspects of the present disclosure are directed to memory block defect detection and management, in particular to memory sub-systems that include memory block defect detection and/or management component. A memory sub-system can be a storage system, storage device, a memory module, or a combination of such. An example of a memory sub-system is a storage system such as a solid-state drive (SSD). Examples of storage devices and memory modules are described below in conjunction with FIG. 1, et alibi. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. One example of non-volatile memory devices is a negative-and (NAND) memory device (also known as flash technology). Other examples of non-volatile memory devices are described below in conjunction with FIG. 1. A non-volatile memory device is a package of one or more dice. Each die can consist of one or more planes. Planes can be groups into logic units (LUN). For some types of non-volatile memory devices (e.g., NAND devices), each plane consists of a set of physical blocks. Each block consists of a set of pages. Each page consists of a set of memory cells ("cells"). A cell is an electronic circuit that stores information. A block hereinafter refers to a unit of the memory device used to store data and can include a group of memory cells, a word line group, a word line, or individual memory cells. For some memory devices, blocks (also hereinafter referred to as "memory blocks") are the smallest area than can be erased. Pages cannot be erased individually, and only whole blocks can be erased.

Each of the memory devices can include one or more arrays of memory cells. Depending on the cell type, a cell can store one or more bits of binary information, and has various logic states that correlate to the number of bits being stored. The logic states can be represented by binary values, such as "0" and "1", or combinations of such values. There are various types of cells, such as single level cells (SLCs), multi-level cells (MLCs), triple level cells (TLCs), and quad-level cells (QLCs). For example, a SLC can store one bit of information and has two logic states.

Some NAND memory devices employ a floating-gate architecture in which memory accesses are controlled based on a relative voltage change between the bit line and the word lines. Other examples of NAND memory devices can employ a replacement-gate architecture that can include the use of word line layouts that can allow for charges corresponding to data values to be trapped within memory cells based on properties of the materials used to construct the word lines.

Memory devices are often used to store important or critical data. However, there are various types of errors and/or failures that can occur during operation of a non-volatile memory device that can lead to loss or damage to the data stored by the memory device. In order to protect against errors and/or failures of a non-volatile memory device, various methodologies have been developed over the years. For example, error correction codes can be employed to detect and correct bit errors that can arise during operation of a non-volatile memory device, while redundant array of NAND (RAIN) techniques can be employed to recover data stored in memory blocks that have experienced an error and/or failure.

For example, a memory sub-system can employ techniques to perform data recovery in the event of a memory defect associated with the programming of user data (e.g., data written by a host system) to a memory device of the memory sub-system. Conventionally, memory defects can be managed by a controller of the memory sub-system by generating parity data (e.g., exclusive-or (XOR) parity data) based on the written host data. The generated parity data (e.g., the XOR parity data) can be written by a controller to a cache memory (e.g., a volatile memory device such as a random access memory (RAM), dynamic random access memory (DRAM), or synchronous dynamic random access memory (SDRAM)) of the controller.

However, as non-volatile memory technology advances and as non-volatile memory architectures (and, hence, the way data is written to the non-volatile memory device) evolves, such techniques may not offer adequate protection against errors and/or failures of a non-volatile memory device. For example, data can be written to a memory device in a manner that can lead to a defect or failure in one plane of the memory device causing failures in other planes of the memory device (e.g., a multi-plane failure).

In many electronic devices (e.g., mobile devices) including electronic devices having an array of memory cells storing multiple bits per cell (e.g., quad-level cells (QLCs)), both multiple page (e.g., multi-page) parity protection and multiple plane (e.g., multi-plane) parity protection (e.g., protection for a failure of a memory device) is employed. In such systems, a large amount of cache memory storage space is required in order to store both multi-page parity data and multi-plane parity data. For example, for multi-page parity protection, 16 KB of parity data can be generated for each page line of the memory sub-system. In addition, a memory sub-system can have a multi-plane memory die (e.g., N planes) including multiple blocks of memory cells arranged in multiple planes (e.g., a multi-plane memory device) for which multi-plane parity protection can be employed. Each block can be divided into multiple sub-blocks that can each include multiple pages per block.

In general, major failures in a memory sub-system can invoke multiple word lines of the memory device and/or multiple planes of the memory device. Memory sub-systems having multiple planes (e.g., N planes per memory die) can require generation and storage of multi-plane parity data to enable protection against a multi-plane failure (e.g., a failure of some or all planes of the memory device). Similarly, memory sub-systems having multiple pages can require generation and storage of multi-page parity data to enable protection against a failure invoking multiple word lines of the memory device (e.g., a failure of some or all word lines of the memory device). However, protecting against both multi-word line failures and multi-plane failures can be difficult both in terms of an amount of memory space required to protect against both types of failures and in performance limitations associated with a memory sub-system.

In some approaches, for a multi-plane arrangement (e.g., a memory die having N planes), memory sub-systems can generate multi-plane parity data by executing an exclusive-or (XOR) operation based on the data written by the host system (also referred to as a resource value (R)) to multiple logical units (e.g., logical unit 1 to logical unit Y) of the memory sub-system. It is noted that each logical unit can include multiple planes (e.g., Plane 0, Plane 1, . . . , Plane N−1). The multi-plane parity data for each plane can be stored in cache memory of the controller. In some approaches, the controller executes an additional XOR operation on the data associated with all of the planes to generate multi-page parity data for each page (e.g., sub-block) or page line (e.g., word line). This multi-page parity can also be stored in cache memory of the controller.

In order to provide protection and/or data recovery in scenarios in which a defect or failure in one plane of the memory device causes failures in other planes of the memory device, some approaches employ redundant array of NAND (RAIN) schemes that can recover data across multiple planes of the memory device in the event such failures. However, such approaches can require large amounts of extra memory space to be used to store data corresponding to a RAIN recovery scheme. For example, in the case of a defect in one plane of the memory device causing a failure in one or more other planes in the memory device, some approaches require upwards of 288 kilobytes of memory space to be allocated for RAIN recovery schemes. This can be especially problematic in mobile memory deployments where the amount of space available is already limited by the size of the mobile device.

Further, RAIN parity encoding and recovery operations can be time consuming and processing intensive, which can hamper the performance of the memory device and hence the computing device in which the memory device is deployed. Again, this can be especially problematic in mobile memory deployments the amount of processing resources available can be diminished in comparison to larger computing system deployments due to the size constraints associated with mobile computing devices.

Some other approaches can detect a defect in a memory block (e.g., by detecting a short in the memory block) and retire the memory block based on the detected defect. However, such approaches may not account for whether the detected defect causes failures in other pages or planes of the memory device and may therefore unnecessarily retire a block that may still be usable.

In addition, given the storage limitations of some memory sub-systems, the parity data can, as memory resources become tied up, be written more frequently. This can lead to a write performance penalty being incurred by the memory sub-system in which more writes (and hence, more program-erase cycles) are incurred in order to protect the host written data. Accordingly, there is a need to reduce the quantity of program-erase cycles invoked in connection with the storage of multi-page and/or multi-plane parity data used of the execution of a data recovery operation in the event of a loss of host written data.

Aspects of the present disclosure address the above and other deficiencies by providing multiple levels of memory defect detection in order to accurately determine whether a defect in one memory block or in one plane of the memory device has caused a failure in a different plane of the memory device. The multiple levels of memory defect detection can be dynamically selected to ensure that the amount of defect detection overkill and the amount of defect detection underkill are balanced. This can allow for performance of the memory device to be optimized while providing adequate defect detection and management.

For example, in some embodiments, a conservative defect detection limit can be set at the beginning of life of the memory device. As the memory device ages and undergoes a greater quantity of program/erase cycles (PECs), a component associated with the memory device, such as the memory block defect detection component 113 illustrated in FIG. 1, herein, can determine if the defect detection limit can be changed to a loose defect detection limit ensure consistent performance of the memory device. As used herein, a "defect detection limit" generally refers to a quantity of pulses that are propagated to a block or plane of a memory device to verify detection of a defect or other failure within the memory device. A "conservative" defect detection limit can be a defect detection limit that corresponds to a pulse count of around five (5) pulses detected by a flash memory emulation component, while a "loose" defect detection limit can be a defect detection limit that corresponds to a pulse count of around seven (7) pulses detected by the flash memory emulation component. In some embodiments, the block defect detection rate can be based on a quantity of detected pulses (e.g., a quantity of detected program step pulses) asserted on the memory block. Embodiments are not so limited, however, and in some embodiments, the block defect detection rate can be based on detection of one or more shorts (e.g., electrical shorts) in the memory block(s). As used herein, a "flash memory emulation component" generally refers to a memory buffer inside a memory device (e.g., a NAND memory device). In some examples, the "flash memory emulation component" can be a ROM emulation memory (REM). In some embodiments, the ROM emulation memory can be used for adding NAND firmware patches to fix NAND firmware bugs or to update or alter NAND firmware algorithms. As opposed to ROM in a memory device where the NAND ROM code cannot be changed without a new tape out, REM allows added flexibility to change NAND firmware algorithms, correct NAND firmware bugs, or otherwise update the NAND firmware without requiring a new tape out.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130, 140 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 can include a memory block defect detection component 113. Although not shown in FIG. 1 so as to not obfuscate the drawings, the memory block defect detection component 113 can include various circuitry to facilitate the embodiments described herein. In some embodiments, the memory block defect detection component 113 can include special purpose circuitry in the form of an ASIC, FPGA, state machine, and/or other logic circuitry that can allow the memory block defect detection component 113 to orchestrate and/or perform the operations described herein.

In some embodiments, the memory sub-system controller 115 includes at least a portion of the memory block defect detection component 113. For example, the memory sub-system controller 115 can include a processor 117 (processing device) configured to execute instructions stored in local memory 119 for performing the operations described herein. In some embodiments, the memory block defect detection component 113 is part of the host system 110, an application, or an operating system.

In a non-limiting example, an apparatus (e.g., the computing system 100) can include a memory block defect detection component 113. The memory block defect detection component 113 can be resident on the memory sub-system 110. As used herein, the term "resident on" refers to something that is physically located on a particular component. For example, the memory block defect detection component 113 being "resident on" the memory sub-system 110 refers to a condition in which the hardware circuitry that comprises the memory block defect detection component 113 is physically located on the memory sub-system 110. The term "resident on" may be used interchangeably with other terms such as "deployed on" or "located on," herein.

Figure 2:
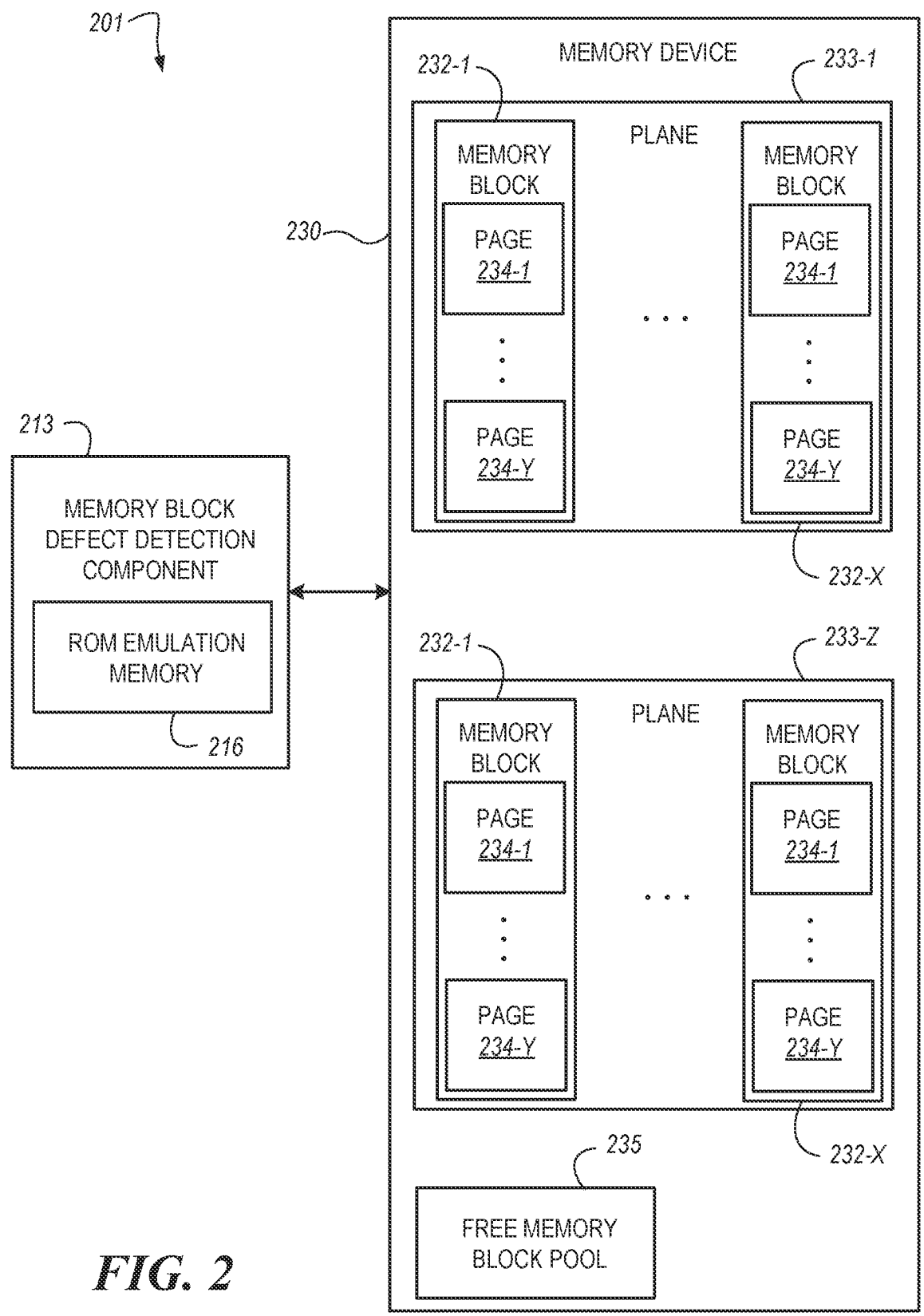
FIG. 2 illustrates an example computing system that includes a memory device and a memory block defect detection component in accordance with some embodiments of the present disclosure.

The memory device 130 of the memory sub-system 110 can include a plurality of memory blocks, such as the memory blocks 232-1 to 232-X illustrated in FIG. 2, that are coupled to the memory block defect detection component 113. In some embodiments, the memory block defect detection component 113 can include a flash memory emulation component, such as the ROM emulation memory 216 illustrated in FIG. 2, herein. The memory block defect detection component 113 can set, for at least one memory block, a block defect detection rate (e.g., a first block defect detection rate). The block defect detection rate can be based on a quantity of detected pulses (e.g., a quantity of detected program step pulses) asserted on the memory block. Embodiments are not so limited, however, and in some embodiments, the block defect detection rate can be based on detection of one or more shorts (e.g., electrical shorts) in the memory block(s). In some embodiments, the block defect detection rate can be set a beginning of life (e.g., during manufacture, during initialization of a flash translation layer of the memory sub-system 110, etc.).

The memory block defect detection component 113 can determine whether the block defect detection rate is greater than a threshold block defect detection rate for the memory block. In some embodiments, the threshold block defect detection rate can correspond to scenarios in which a plane of the memory block that may not be experiencing a failure that affects other planes of the memory device 130 is retired prematurely. This can reduce overkill events in retiring memory blocks that are not experiencing failures that are characterized by a failure of a plane (e.g., the plane 233-1 illustrated in FIG. 2) of the memory device causing a failure in a different plane (e.g., the plane 233-Z illustrated in FIG. 2) of the memory device.

In response to a determination that the first block defect detection rate is greater than the threshold block defect detection rate for the memory block, the memory block defect detection component 113 can assert a program command on the memory block. The memory block defect detection component 113 can then determine whether a program operation associated with assertion of the program command on the memory block is successful. In some embodiments, the memory block defect detection component 113 can, in response to a determination that the program operation is unsuccessful, determine that a failure involving a plane (e.g., the plane 233-1 illustrated in FIG. 2) associated with the memory block and another plane (e.g., the plane 233-Z illustrated in FIG. 2) associated with the memory sub-system 110 has occurred.

Continuing with this example, the memory block defect detection component 113 can, in response to the determination that the block defect detection rate (e.g., a first block defect detection rate) is greater than the threshold block defect detection rate for the memory block, perform an operation to refresh data written to the memory block prior to assertion of the program command. By performing the operation to refresh the data in the memory block, the memory block defect detection component 113 can determine whether a failure associated with the memory block that has not affected other planes of the memory sub-system 110 has occurred.

If, however, it is determined that the program operation is successful, the memory block defect detection component 113 can update the block defect detection rate to a different block defect detection rate (e.g., a second block defect detection rate). The block defect detection rate and/or the different block defect detection rate can, in some embodiments, correspond to a threshold pulse count limit associated with performance of memory operations involving the at least one memory block. The different block defect detection rate (e.g., the second block defect detection rate) can be greater than the previous block defect detection rate (e.g., the first block defect detection rate). For example, the first block defect detection rate can be around 5 pulses and the second block defect detection rate can be around 7 pulses, although embodiments are not limited to these specific pulse quantities.

FIG. 2 illustrates an example computing system 201 that includes a memory device 230 and a memory block defect detection component 213 in accordance with some embodiments of the present disclosure. The memory device 230 can be analogous to the memory device 130 illustrated in FIG. 1, herein and the memory block defect detection component 213 can be analogous to the memory block defect detection component 113 illustrated in FIG. 1, herein. As shown in FIG. 2, the memory device 230 can include planes 233-1 to 233-Z, which can include memory blocks 232-1 to 232-X, which can further include multiple pages 234-1 to 234-Y. The memory device 230 can include a free memory block pool 235. The free memory block pool 235 can be a set of memory cells that are erased and therefore ready to have new data written to them. Further, as shown in FIG. 2, the memory block defect detection component 213 can include ROM emulation memory 216.

In a non-limiting example, a system 201, which can be analogous to the computing system 100 illustrated in FIG. 1 can include a memory device 230 having blocks of memory cells 232-1 to 232-X corresponding thereto. As shown in FIG. 2, the memory device 230 includes multiple planes 233-1 to 233-Z that can include multiple memory blocks 232-1 to 232-X. Each memory block 232-1 to 232-X can include multiple pages 234-1 to 234-Y of memory cells. A processing device (e.g., the memory block defect detection component 213 illustrated in FIG. 2, and/or the processor 117, and/or the local media controller 135 illustrated in FIG. 1, herein) can be coupled to the blocks 232-1 to 232-X of memory cells and can perform operations that include setting, for at least one memory block 232-1 to 232-X, a block defect detection rate (e.g., a first block defect detection rate) that corresponds to a threshold pulse count limit (e.g., a first a threshold pulse count limit) for performance of memory operations involving the memory block 232-1 to 232-X.

The processing device can further perform operations including determining whether the block defect detection rate is greater than a threshold block defect detection rate (e.g., a first block defect detection overkill rate) for a memory block 232-1 to 232-X. In response to determining that the block defect detection rate is greater than the threshold block defect detection rate for the memory block, the processing device can perform an operation to refresh data written to the memory block 232-1 to 232-X.

In some embodiments, the processing device can perform operations including asserting, subsequent to performing the operation to refresh the data written to the memory block 232-1 to 232-X, a program command involving the memory block 232-1 to 232-X and/or determining whether a program operation associated with assertion of the program command involving the memory block 232-1 to 232-X is successful. In response to a determination that the program operation is unsuccessful, the processing device can perform operations including determining that a failure involving the memory block 232-1 to 232-X and/or a page 234-1 to 234-Y of memory cells associated with the memory block 232-1 to 232-X and/or a page 234-1 to 234-Y of memory cells associated with a different memory block 232-1 to 232-X has occurred. The processing device can perform operations including retiring the memory block 232-1 to 232-X in response to determining that a failure involving a plane 233-1 of the memory device 230 and/or another plane 233-Z of the memory device 230 has occurred.

In some embodiments, the processing device can perform operations including returning, in response to the determination the program operation is successful, the memory block 232-1 to 232-X to a free block memory pool 235 cells of the memory sub-system. The processing device can further perform operations including updating, in response to a determination the program operation is successful, the first block defect detection rate to a second block defect detection rate. In some embodiments, the second block defect detection rate can correspond to a second threshold pulse count limit for performance of memory operations involving the memory block 232-1 to 232-X. The second block defect detection rate can be greater than the first block defect detection rate.

The processing device can, in some embodiments, perform operations including in response to determining that the first defect detection rate is greater than the first threshold defect detection rate, assigning a second defect detection rate to memory block 232-1 to 232-X and determining whether the second defect detection rate is greater than the second threshold defect detection rate. In response to determining that the second defect detection rate has exceeded the second threshold defect detection rate, the processing device can perform operations including determining that a failure involving a plane 233 associated with the memory block 232-1 to 232-X and/or another plane 233-Z associated with the memory device 230 has occurred. The processing device can further perform operations including performing an operation to refresh data associated with the memory block 232-1 to 232-X and can perform operations including retiring the memory block 232-1 to 232-X based on determining that the failure involving the plane 233-1 and/or another plane 233-Z associated with the memory device 230 has occurred.

Figure 3:
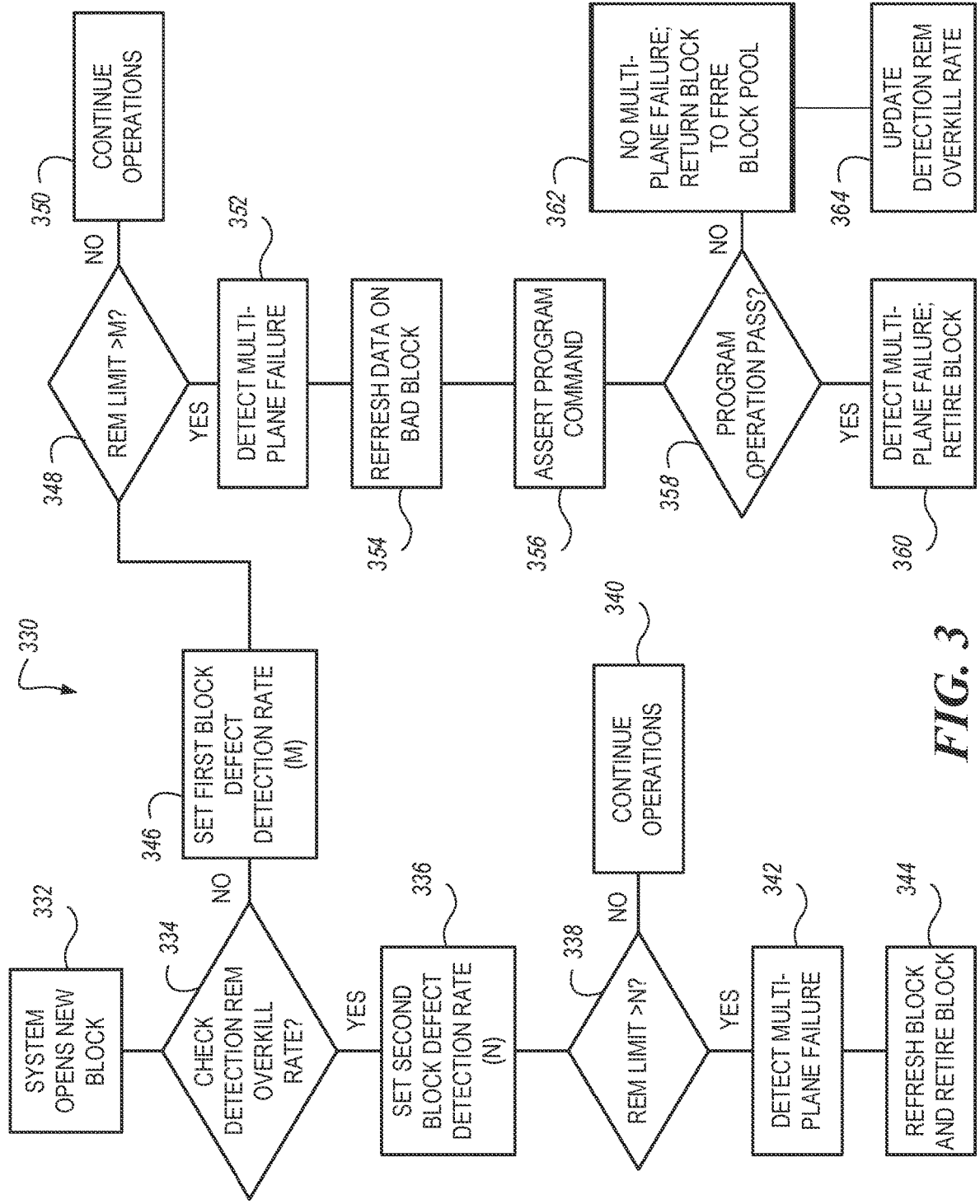
FIG. 3 is a flow diagram corresponding to memory block defect detection and management in accordance with some embodiments of the present disclosure.

FIG. 3 is a flow diagram 330 corresponding to memory block defect detection and management in accordance with some embodiments of the present disclosure. The operations described in connection with FIG. 3 can be performed by a memory block defect detection component (e.g., the memory block defect detection component 113/213 illustrated in FIG. 1 and FIG. 2, herein). Embodiments are not so limited, however, and in some embodiments, the operations described in connection with FIG. 3 can be performed by a controller (e.g. the memory sub-system controller 115 illustrated in FIG. 1) and/or by a processor (e.g., the processor 117 illustrated in FIG. 1, herein). At operation 332, a memory sub-system (e.g., the memory sub-system 110 illustrated in FIG. 1) can open a new memory block, (e.g., one of the memory blocks 232-1 to 232-X illustrated in FIG. 2). In some embodiments, the memory block can be opened such that the memory block is placed in a state in which data can be written to the memory block.

At operation 334, a check can be performed to determine if the memory block has an overkill rate associated therewith. In some embodiments, the overkill rate can be an overkill rate associated with a flash emulation component (e.g., a REM overkill rate limit) that can be used to determine whether the memory block has received a threshold quantity of program pulses that correspond to determining whether a failure of the memory block has occurred. As described below, the threshold quantity of program pulses can be a maximum number of program pulses that can be asserted on the memory block in response to determining that a short or other failure that involves the memory block has occurred. Accordingly, in some embodiments, the REM overkill rate limit can be a quantity of program pulses that can be asserted on the memory block in response to determining that a short or other failure that involves the memory block has occurred.

If it is determined at operation 334 that the memory block has an overkill rate associated therewith, at operation 336, the overkill rate can be updated to a different (e.g., a second) block defect overkill detection rate (N). In some embodiments, the different block defect overkill detection rate can be greater than the previous block defect overkill detection rate. Subsequent to updating the block defect overkill detection rate, at operation 338 a determination as to whether the REM overkill rate limit is greater than the block defect overkill detection rate (N). For example, at operation 338, a determination can be made as to whether the REM overkill rate limit for the current block defect overkill detection rate (N) has been exceeded. If the REM overkill rate limit has not been exceeded, at operation 340 normal program operations involving the memory block can commence.

If, however, the REM overkill rate limit has been exceeded, at operation 342 it can be determined that a multi-plane (or multi-page) failure involving the memory block has occurred. In response to determining that the multi-plane (or multi-page) failure involving the memory block has occurred, at operation 344 an operation to refresh the data stored in the memory block can be performed and the memory block can subsequently retired.

If it is determined at operation 334 that the memory block does not have an overkill rate associated therewith, at operation 346, a block defect detection rate (M) (e.g., a first block defect detection rate) can be set for the memory block. In some embodiments, the block defect detection rate (M) can be lower (e.g., can have a lower pulse count associated therewith) than the block defect detection rate (N). At operation 348, a determination as to whether the REM limit is greater than the block defect overkill detection rate (M). For example, at operation 348, a determination can be made as to whether the REM overkill rate limit for the current block defect overkill detection rate (M) has been exceeded. If the REM overkill rate limit has not been exceeded, at operation 350 normal program operations involving the memory block can commence.

If, however, the REM overkill rate limit has been exceeded, at operation 352 it can be determined that a multi-plane (or multi-page) failure involving the memory block has occurred. In response to determining that the multi-plane (or multi-page) failure involving the memory block has occurred, at operation 354 an operation to refresh the data stored in the memory block can be performed. Subsequent to performance of the refresh operation, at operation 356, a program command can be asserted to the memory block of any plane of a memory device (e.g., the memory device 130/230 illustrated in FIG. 1 and FIG. 2, herein). In some embodiments, the program command can be a single program command asserted to a bad memory block of any plane of the memory device. By asserting such a program command and verifying if the command passes (e.g., at operation 358), a mechanism for double checking whether a failure experienced by the memory block is actually a failure that involves multiple planes of the memory device. In contrast to other approaches, this can allow for a determination to be made as to whether the failure is indeed a multi-plane failure prior to retiring the block, thereby reducing a quantity of memory blocks that are unnecessarily retired in other approaches.

At operation 358, it can be determined whether the program command was successful. If the program command is not successful, it can be determined that the memory block has experienced a failure that involves multiple planes of the memory device and the memory block can be retired. In contrast, if the program command is successful, it can be determined at operation 362 that the memory block has not experienced a failure that involves multiple planes of the memory device and the memory block can be returned to the free block pool (e.g., the free memory block pool 235 illustrated in FIG. 2). Subsequently, the block defect detection overkill rate can be updated. For example, the block defect detection overkill rate (M) can be updated to a different block defect detection overkill rate (N).

Figure 4:
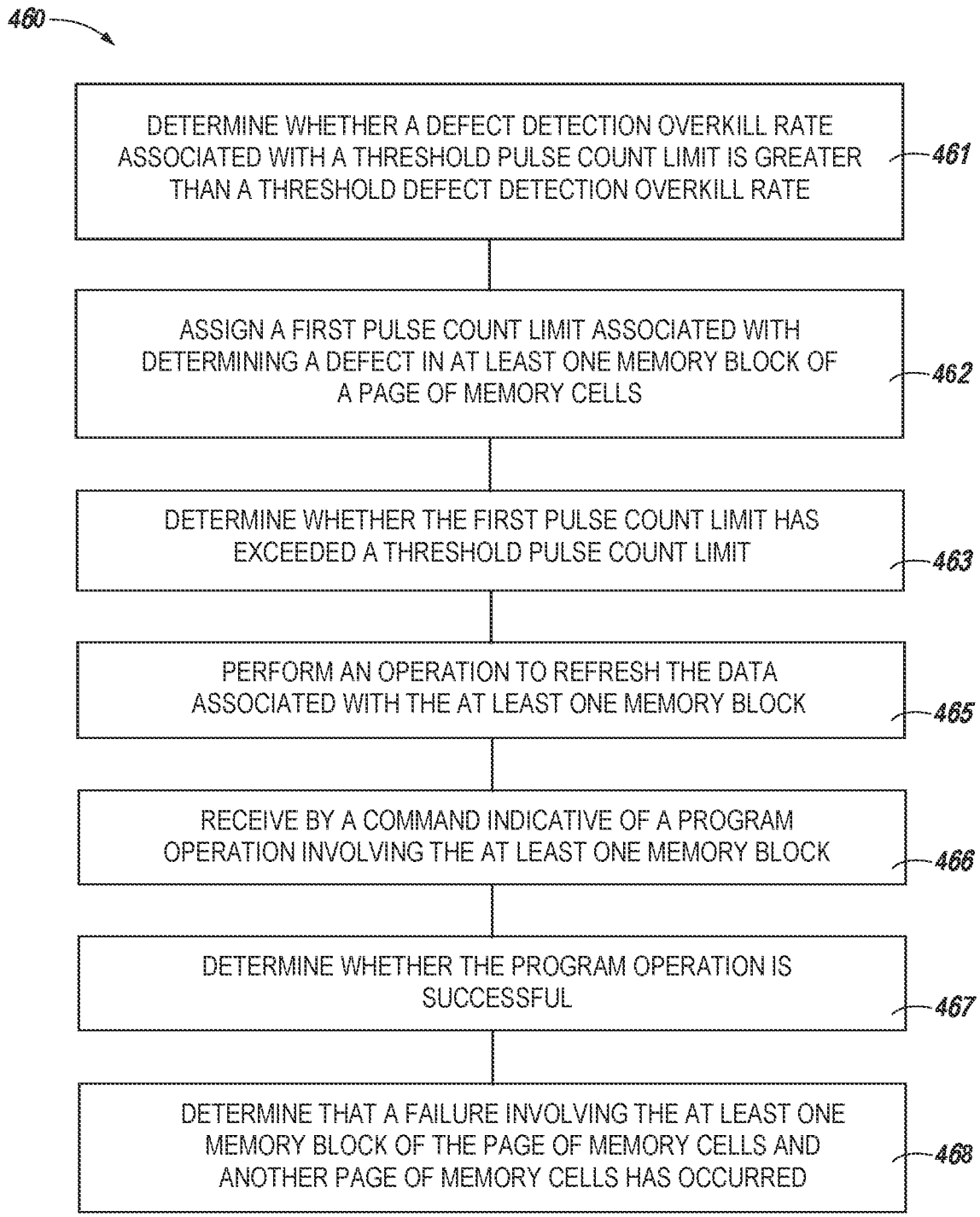
FIG. 4 is a flow diagram corresponding to a method for memory block defect detection and management in accordance with some embodiments of the present disclosure.

FIG. 4 is flow diagram corresponding to a method 460 for memory block defect detection and management in accordance with some embodiments of the present disclosure. The method 340 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 460 is performed by the memory block defect detection component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 461, it can be determined whether a defect detection overkill rate associated with a threshold pulse count limit is greater than a threshold defect detection overkill rate. In some embodiments, the defect detection overkill rate can be analogous to the defect detection overkill rate (N) and/or the defect detection overkill rate (M) described in connection with FIG. 3, while the threshold pulse count limit can be analogous to the REM overkill rate limit described in connection with FIG. 3. In some embodiments, the defect detection overkill rate and/or the threshold defect detection overkill rate can be determined using a flash memory emulator component coupled to the memory block. The flash emulator component can be analogous to the ROM emulation memory 216 illustrated in FIG. 2.

At operation 462, a first pulse count limit associated with determining a defect in a memory block (e.g., a memory block 232-1 to 232-X illustrated in FIG. 2, herein) of a memory device (e.g., the memory device 130/230 illustrated in FIG. 1 and FIG. 2, herein) can be assigned in response to determining that the defect detection overkill rate associated with the threshold pulse count limit is less than the threshold defect detection overkill rate. At operation 463, it can be determined whether the first pulse count limit has exceeded a threshold pulse count limit.

At operation 464, an operation to refresh the data associated with the memory block can be performed in response to determining that the first pulse count limit has exceeded the threshold pulse count limit. In some embodiments, in response to determining that the defect detection overkill rate associated with the threshold pulse count limit is greater than the threshold defect detection overkill rate, a second pulse count limit associated with determining a defect in memory block can be assigned. As described above, the second pulse count limit can be greater than the first pulse count limit.

In some embodiments, in response to determining that the defect detection overkill rate associated with the threshold pulse count limit is greater than the threshold defect detection overkill rate, a second pulse count limit associated with determining a defect in the at least one memory block can be assigned and it can be determined whether the second pulse count limit has exceeded a second threshold pulse count limit. In response to determining that the second pulse count limit has exceeded the second threshold pulse count limit, it can be determined that a failure involving a plane associated with the at least one memory block and another plane associated with the memory device has occurred. Subsequent to such a determination, an operation to refresh data associated with the at least one memory block can be performed and the memory block can be retired. In contrast, if it is determined that the second pulse count limit has not exceeded the second threshold pulse count limit, a memory operation involving the at least one memory block can be performed.

At operation 465, a command indicative of a program operation involving the memory block can be received by a processing device (e.g., the block defect detection component 113/213 illustrated in FIG. 1 and FIG. 2, herein) coupled to the memory block. At operation 466, the processing device can determine whether the program operation is successful. In response to determining that the program operation is not successful, at operation 467, it can be determined that a failure involving a plane associated with the one memory block and another plane of the memory device has occurred.

If it is determined that the program operation is successful, however, it can be determined that the failure involves the memory block and does not involve other planes of the memory device. In response to such a determination, the memory block can be returned to a free memory block pool, such as the free memory block pool 235 illustrated in FIG. 2, herein. In some embodiments, in response to returning the memory block to the free memory block pool, the defect detection overkill rate associated with the memory block can be updated as described above in connection with FIG. 3.

Figure 5:
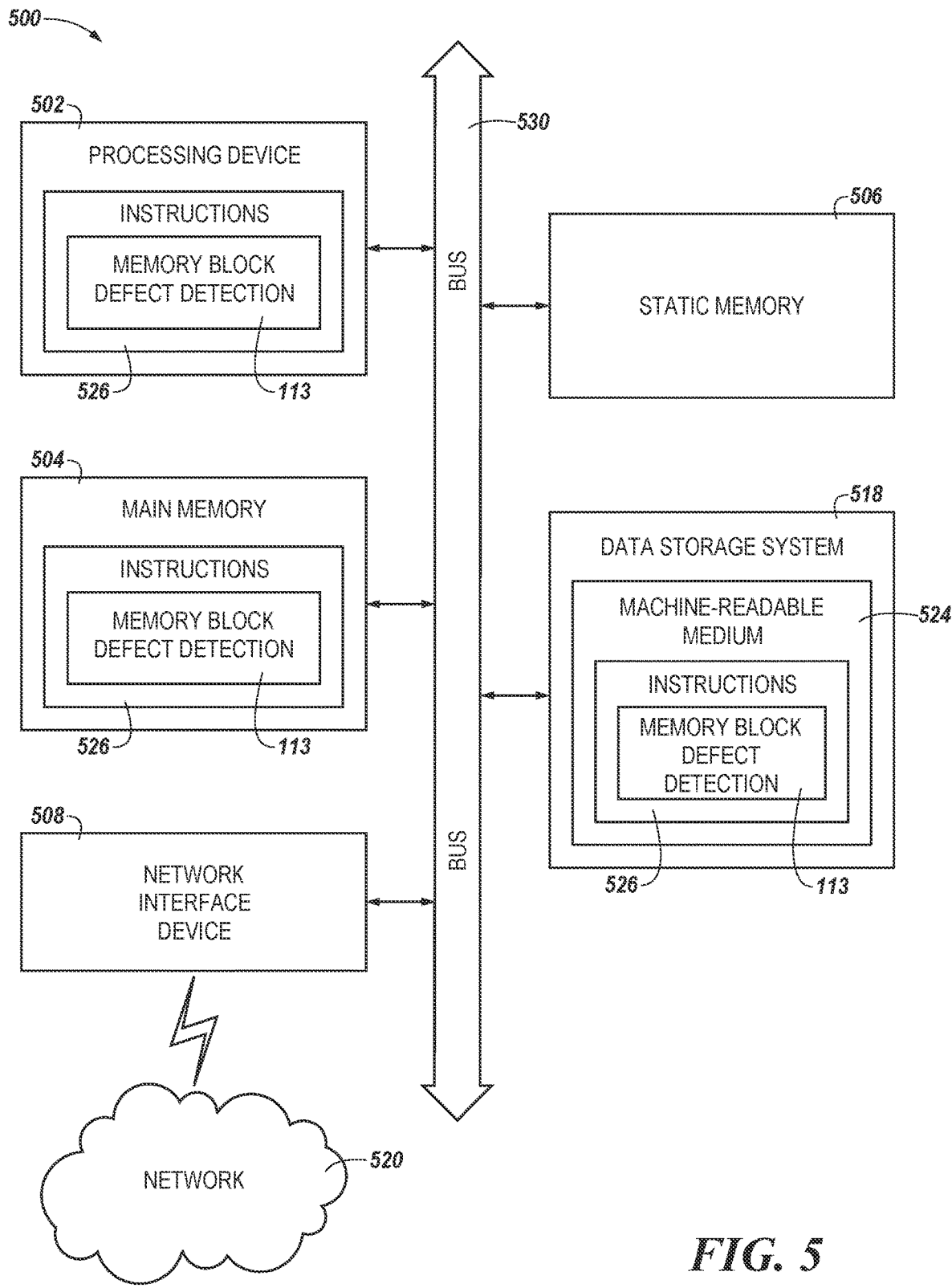
FIG. 5 is a block diagram of an example computer system in which embodiments of the present disclosure may operate.

FIG. 5 is a block diagram of an example computer system 500 in which embodiments of the present disclosure may operate. For example, FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the memory block defect detection component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

The processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 404 can correspond to the memory sub-system 110 of FIG. 1.

In one embodiment, the instructions 526 include instructions to implement functionality corresponding to a memory block defect detection component (e.g., the memory block defect detection component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:
1. An apparatus, comprising:
 a plurality of memory blocks; and
 a controller, wherein the controller is configured to:
  determine whether a block defect rate for a memory block among the plurality of memory blocks meets a threshold block defect rate criteria associated with the memory block;
  execute a program command involving the memory block in response to determining that the threshold block defect rate criteria exceeds the threshold block defect rate for the memory block; and
  in response to a determination that execution of the program command is unsuccessful, determine that a failure involving a plane associated with the memory block and a plane associated with a different memory block has occurred.
2. The apparatus of claim 1, wherein the controller is configured to, in response to determining that the block defect rate criteria exceeds the threshold block defect rate for the memory block, perform an operation to refresh data written to the memory block prior to execution of the program command.

3. The apparatus of claim 1, wherein the controller is configured to, in response to a determination the program command is successful, update the block defect rate to a second block defect rate.

4. The apparatus of claim 3, wherein the second block defect rate is greater than the block defect rate.

5. The apparatus of claim 1, wherein the block defect rate corresponds to a threshold pulse count limit associated with performance of memory operations involving the memory block.

6. The apparatus of claim 1, wherein the controller is configured to set the block defect rate at a beginning of life of a memory device that includes the plurality of memory blocks.

7. The apparatus of claim 1, wherein the controller includes, or is coupled to, a flash memory emulation component.

8. A method, comprising:
 determining whether a defect detection overkill rate corresponding to a threshold pulse count limit meets a particular criteria;
 assigning a first pulse count limit associated with determining a defect in a memory block of a memory device in response to determining that the particular criteria is less than a threshold defect detection overkill rate;
 determining whether the first pulse count limit has exceeded a pulse count limit;
 performing an operation to refresh data associated with the memory block in response to determining that the first pulse count limit has exceeded the pulse count limit;
 performing a program operation involving the memory block subsequent to performing the operation to refresh the data associated with the memory block; and
 determining that a failure involving a plane associated with the memory block and another plane of the memory device has occurred in response to determining that the program operation is not successful.

9. The method of claim 8, further comprising:
 determining that a failure involving only the memory block has occurred in response to determining that the program operation is successful; and
 returning the memory block to a free memory block pool responsive to the determination that the failure involving only the memory block has occurred.

10. The method of claim 9, further comprising updating the defect detection overkill rate in response to returning the memory block to the free memory block pool.

11. The method of claim 8, further comprising assigning a second pulse count limit associated with determining a defect in the memory block in response to determining that the particular criteria is greater than the threshold defect detection overkill rate.

12. The method of claim 11, further comprising:
 determining whether the second pulse count limit has exceeded a second threshold pulse count limit;
 determining that a failure involving a plane associated with the memory block and another plane associated with the memory device has occurred in response to determining that the second pulse count limit has exceeded the second threshold pulse count limit.

13. The method of claim 12, further comprising performing a memory operation involving the memory block in response to determining that the second pulse count limit has not exceeded the second threshold pulse count limit.

14. The method of claim 8, wherein the memory device is resident on a mobile computing device.

15. A system, comprising:
 a memory device comprising a plurality of blocks of memory cells; and
 a processing device coupled to the memory device, wherein the processing device is configured to:
  set a block defect detection rate corresponding to a threshold pulse count limit for performance of memory operations involving at least one memory block among the plurality of blocks of memory cells;
  determine whether the block defect detection rate is greater than a threshold block defect detection rate for the at least one memory block;
  perform an operation to refresh data written to the at least one memory block in response to determining that the block defect detection rate is greater than the threshold block defect detection rate for the at least one memory block;
  determine whether a program operation involving the at least one memory block is successful or unsuccessful; and
  determine that a failure involving a plane associated with the at least one memory block or another plane associated with the memory device, or both, has occurred in response to a determination the program operation is unsuccessful.

16. The system of claim 15, wherein the processing device is configured to retire the at least one memory block in response to the determination that the failure involving the plane associated with the at least one memory block and the other plane associated with the memory device has occurred.

17. The system of claim 15, wherein the processing device is configured to update the block defect detection rate to a different block defect detection rate in response to a determination the program operation is successful.

18. The system of claim 17, wherein the processing device is configured to assign the at least one memory block to a free block pool of memory cells of the memory device in response to the determination the program operation is successful.

19. The system of claim 15, wherein the processing device is configured to:
 assign a second defect detection overkill rate to the at least one memory block in response to determining that the defect detection rate is greater than the threshold defect detection rate;
 determine whether the second defect detection overkill rate is greater than a second threshold defect detection rate; and
 determine that a failure involving the plane associated with the at least one memory block or the other plane associated with the memory device, or both, has occurred in response to determining that the second defect detection rate has exceeded the second threshold defect detection rate.

20. The system of claim 15, wherein the processing device is communicatively coupled to a ROM emulation memory component.

* * * * *